(12) United States Patent
Luchsinger (10) Patent No.: US 8,191,819 B2
(45) Date of Patent: Jun. 5, 2012

(54) FLOATING BEARING STRUCTURE WITH STATIC BUOYANCY

(75) Inventor: Rolf Luchsinger, Uster (CH)

(73) Assignee: Prospective Concepts AG, Dietikon (CH)

( * ) Notice: Subject to any disclaimer, the term of this patent is extended or adjusted under 35 U.S.C. 154(b) by 986 days.

(21) Appl. No.: 10/569,764

(22) PCT Filed: Jun. 24, 2004

(86) PCT No.: PCT/CH2004/000385
§ 371 (c)(1),
(2), (4) Date: Apr. 18, 2007

(87) PCT Pub. No.: WO2005/021898
PCT Pub. Date: Mar. 10, 2005

(65) Prior Publication Data
US 2007/0267538 A1  Nov. 22, 2007
US 2009/0065633 A9  Mar. 12, 2009

(30) Foreign Application Priority Data
Aug. 27, 2003  (CH) ..................... 1462/03

(51) Int. Cl.
*B64B 1/58* (2006.01)
*B64B 1/16* (2006.01)
*B64B 1/30* (2006.01)
*E04B 1/34* (2006.01)
*E04H 15/20* (2006.01)
*E01D 15/20* (2006.01)

(52) U.S. Cl. ............ 244/30; 52/2.11; 52/2.25; 244/128; 14/2.6

(58) Field of Classification Search .................. 52/2.11, 52/2.13, 2.25; 244/30, 128; 14/2.6
See application file for complete search history.

(56) References Cited

U.S. PATENT DOCUMENTS

| 5,058,330 A | * | 10/1991 | Chow .............................. 52/2.11 |
| 6,176,646 B1 | | 1/2001 | Finn et al. |
| 2002/0157322 A1 | | 10/2002 | Pedretti |
| 2002/0157361 A1 | | 10/2002 | Kato et al. |

FOREIGN PATENT DOCUMENTS

| CA | 2212770 | 2/1999 | |
| GB | 693423 | 7/1953 | |
| JP | 6-317043 | * 11/1994 | ................ 52/11 |
| JP | 2000045225 A | 2/2000 | |
| WO | WO-95/30573 | 11/1995 | |
| WO | WO-97/33790 | 9/1997 | |
| WO | WO-01/73245 | 10/2001 | |
| WO | WO-02/094650 A1 | 11/2002 | |
| WO | WO-2004003569 | 1/2004 | |
| WO | WO-2004083568 | 9/2004 | |
| WO | WO-2005007991 | 1/2005 | |

* cited by examiner

*Primary Examiner* — Rob Swiatek
(74) *Attorney, Agent, or Firm* — Winstead PC

(57) ABSTRACT

A suspended load-bearing structure that is formed by pneumatic structural load-bearing elements comprising an elongate hollow body, compression bars, and traction elements. The hollow body is impinged upon by gases that are lighter than air. In a first embodiment, an individual suspended structural load-bearing element is used as a ridge beam of a large tent hall whose interior has no pillars. The roof is formed by a waterproof cover, the sides of which are stretched on pillars. The cover and the structural load-bearing element are anchored to the ground by means of anchoring ropes.

22 Claims, 6 Drawing Sheets

FLOATING BEARING STRUCTURE WITH STATIC BUOYANCY

The present invention relates to floating bearing structures according to the preamble of claim 1.

Lighter-than-air structures with static buoyancy are proposed for example in WO 97/33790 (D1) as stationary communications platforms in the region of the stratosphere. Apart from the generally known classic airships, which are equipped for example as rigid airships with a form-giving endoskeleton and are chiefly used for transport and advertising purposes, WO 95/30573 (D2) discloses an airship in the form of an air castle, which is intended to fly as a whole and contains working and living spaces. A number of pneumatic structural elements or supports with an inflatable hollow body as well as separate compression and tension elements have become known, thus for example from WO 01/73245 (D3) or from three CH patent applications, namely CH2003 0492/03 (D4), CH2003 0493/03 (D5), CH2003 1259/03 (D6).

The floating platform in D1 is carried by two gas-filled bubbles with a more or less aerodynamic shape, actual balloons or non-rigid or semi-rigid airships. The platform itself has no buoyancy and serves solely to accommodate technical devices. D2 essentially shows a rigid airship with an extraordinary shape and large utility spaces in the interior of the structure. The utility and passenger spaces are integrated into the airship body, instead of being suspended beneath it. D3 discloses a pneumatic structural element, which contains a hollow body pressurised with compressed air for stabilisation of a compression member. The hollow body, however, is not provided for the accommodation of a gas which is lighter than air and therefore does not have any static buoyancy. D4 to D6 are developments and special cases of D3. D3 thus represents the closest prior art.

The problem of the present invention consists in creating fixed stable bearing structures with separate tension and compression elements, which can wholly or almost float in the sense of an extreme lightweight construction method. These floating structural parts enable new solutions for temporary roofing or simplified assembly work without the aid of a crane. The bearing-structure elements are intended to enable, instead of spherical or ellipsoid-shaped structural shapes, longitudinal or two-dimensionally extending and yet buckle-stable shapes, which moreover offer small surfaces exposed to the wind.

The solution to the problem is presented in the characterising part of claim 1 with respect to its main features, and in the following claims with respect to further advantageous developments.

With the aid of the appended drawings, the subject-matter of the invention is explained in greater detail by means of several examples of embodiment.

Figure 1:
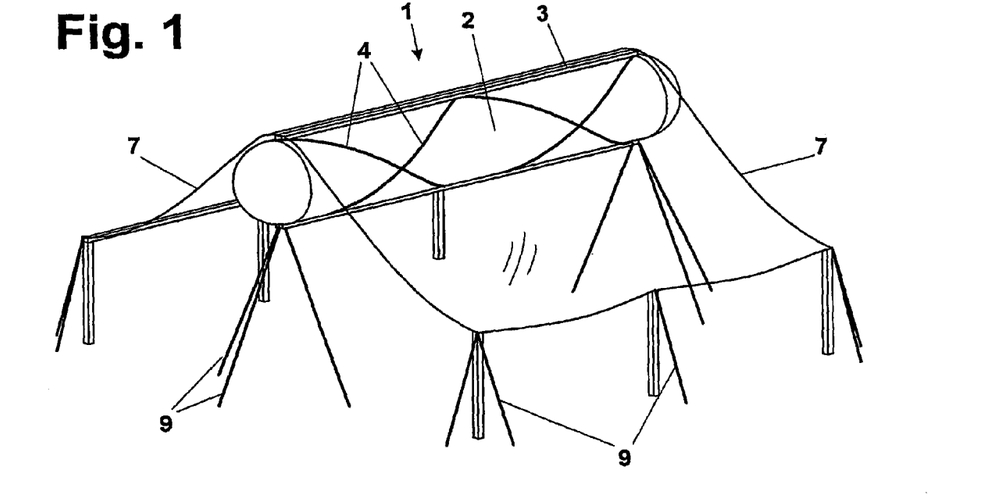
FIG. 1 shows an isometric projection of a first example of embodiment of a floating bearing structure, FIG. 2a,b show diagrammatic representations of a second example of embodiment of a floating bearing structure as an isometric projection and in cross-section, FIG. 3a,b show diagrammatic representations of a third example of embodiment of a floating bearing structure in a plan view and in cross-section, FIG. 4a,b show diagrammatic representations of an example of embodiment of a floating bearing-structure element in cross-section in the floating and non-floating state.

FIG. 1 shows a diagrammatic representation of a first example of embodiment of the idea of the invention. A hollow body 2 of a bearing-structure element 1 is filled with a gas or gas mixture, referred to hereafter as light gas, which is lighter than air. Non-combustible balloon gas, for example, is suitable as a filling medium, said balloon gas being around 95% of the noble gas helium. The term light gas, however, also includes hot air at for example 100° C., which has a lower specific weight than cold air with a lower temperature. Geometrically similarly dimensioned bearing-structure elements 1 filled with light gas, designed with the same proportions and for the same load per unit area, begin from a certain size to float. The buoyancy of bearing-structure element 1 becomes positive from this size on account of the increase in volume which is disproportionate to the length and surface, and the buoyancy of the light gas compensates for the inherent weight of bearing-structure element 1. This size depends on the inherent weight of bearing-structure element 1, i.e. the materials used and the material quantities, and also on the available fillable volume and the light gas used. The larger the bearing-structure element 1, the smaller will be the ratio of its inherent weight to the buoyancy of the light gas volume and the greater will be the buoyancy of bearing-structure element 1. In the case of a bearing-structure element 1 according to D3, with a fixed ratio of length L to diameter D of 10 and a design for a large load per unit area of 100 kg/m$^2$, the buoyancy is greater than the inherent weight from a length of approx. 50 m when hollow body 2 is filled with balloon gas. A bearing-structure element 1 designed for smaller loads per unit area is correspondingly lighter with identical proportions and the inherent weight is already compensated for by the buoyancy with much shorter lengths L. The beam thus created as fixed bearing-structure element 1, depending on the dimensioning, is therefore very light and has a net buoyancy. In this first example of embodiment shown in FIG. 1, a single floating bearing-structure element 1 with compression members 3 and tension elements 4 serves as a ridge beam of a large tent hall with a support-free internal space. The roof is formed by a watertight covering 7 anchored at the sides on supports. The parts of the tent hall concealed by covering 7 are shown non-dashed in FIG. 1 to illustrate them better.

In addition, the ridge beam can be supported by means of lightweight supports and thus be held at a fixed distance from the ground. These supports are able not only to pull bearing-structure element 1 to the ground, but can also compensate for smaller buoyancy fluctuations.

Such a tent has the advantage that the whole interior space is free from pillars and that it can be erected very easily and quickly. After the tent has been assembled on the ground, hollow body 2 of bearing-structure element 1 can be filled with a light gas, after which the tent erects itself automatically. The construction is held to the ground and secured against acting wind forces by rope anchorings 9 directly on bearing-structure element 1 and on all sides of water-tight covering 7. The floating roof can subsequently be shifted at little expense to another location.

Figure 2:
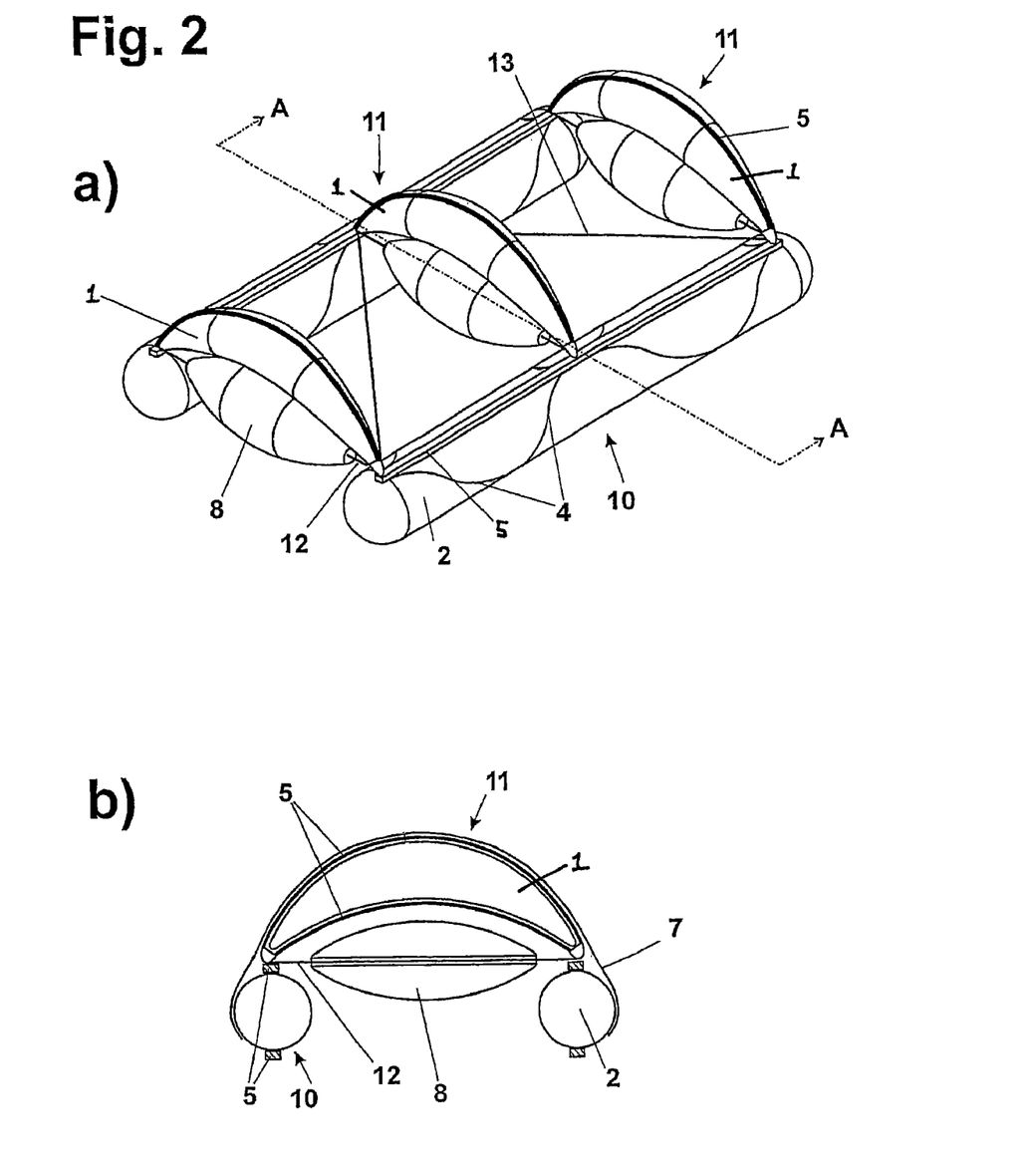

FIG. 2 shows a second example of embodiment of a floating roof constructed from floating bearing-structure elements 1. A water-tight covering 7 is stretched over two longitudinal supports 10, which are connected together by a plurality of arc-shaped transverse supports 11, as a result of which an arched roof is formed. A representation of covering 7 has been dispensed with in the isometric projection of FIG. 2a for the sake of better illustration. The ends of transverse supports 11 are connected together, for example, by external tension elements 12. Bearing-structure elements 1 include two elements accommodating longitudinally both compressive and tensile forces. These elements are referred to in the following as compression/tension elements 5, and have been selected in this example of embodiment as transverse supports 11. For example, a steel rod can be used as compression/tension element 5. The construction, moreover, is reinforced and stabilised by cross-bracings 13 running crosswise from transverse support 11 to transverse support 11. Other rope bracings serving to stabilise the bearing structure are known to the expert. Depending on the number and dimensioning of bearing-structure elements 1, it may happen that the buoyancy of the same is not sufficient to cause the whole roof together with water-tight covering 7 to float and to hold the latter in the air with sufficient buoyancy reserve. In this case, a buoyancy body 8 can be fitted beneath the barrel-shaped arch and filled with a light gas to provide additional buoyancy. This buoyancy body 8 can be produced from a lightweight gas-tight membrane and fixed, for example, to transverse supports 11 by means of glued-on fixing plates. Buoyancy body 8 can also be enveloped with a net, for example, for a simplified fixing to bearing-structure elements 1. Another type of construction of buoyancy body 8 commonly employed by the expert has a two-layer structure, with an external low-expansion envelope and a gas-tight elastic bubble inserted therein to accommodate the light gas. In the example of embodiment shown, buoyancy bodies 8 are fitted beneath transverse supports 11 and surround external tension element 12 in a ring-shaped fashion. FIG. 2b shows the example of embodiment in section AA, whereby covering 7 is represented here. Covering 7 is fixed to longitudinal supports 10 by means of a detachable connection.

Figure 3:
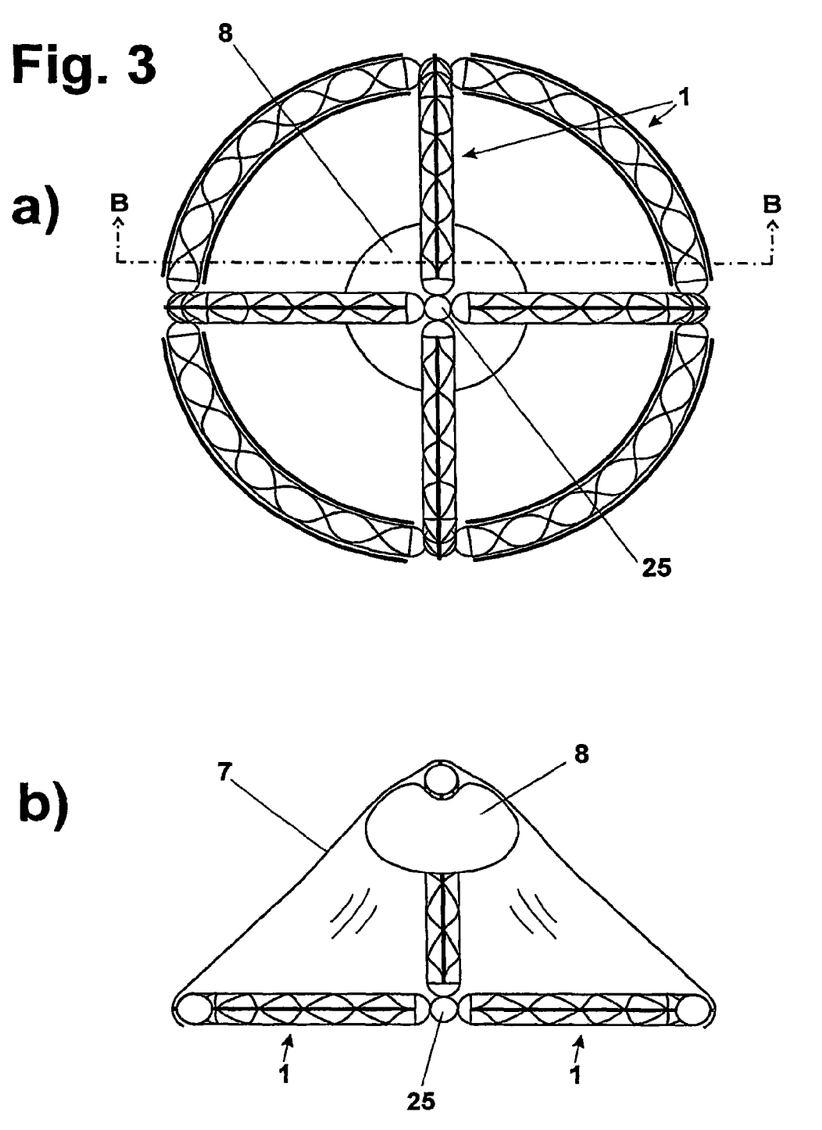

FIG. 3 shows a third example of embodiment of a floating roof. A plurality of bearing-structure elements 1 are connected by means of connection pieces 25 and form a circle or an ellipse-like shape, onto which a dome-shaped four-legged structure is placed with four additional arch-shaped bearing-structure elements 1. A water-tight covering 7, which is again omitted in the plan view in FIG. 3a, is pulled over the dome and fixed to bearing-structure elements 1, as can be seen from FIG. 3b. Additional buoyancy can again be made available by one or more additional buoyancy bodies 8 filled with light gas, which are not part of the bearing structure. In this third example of embodiment, such a buoyancy body 8 is secured beneath the dome to bearing-structure elements 1. It is important that attention is paid to a stable airborne position during the planning of the floating structures. In order to make it impossible or at least difficult for the structure to overturn during free floating, it is obvious that the centre of gravity will lie below the buoyancy centre of gravity.

Figure 4:
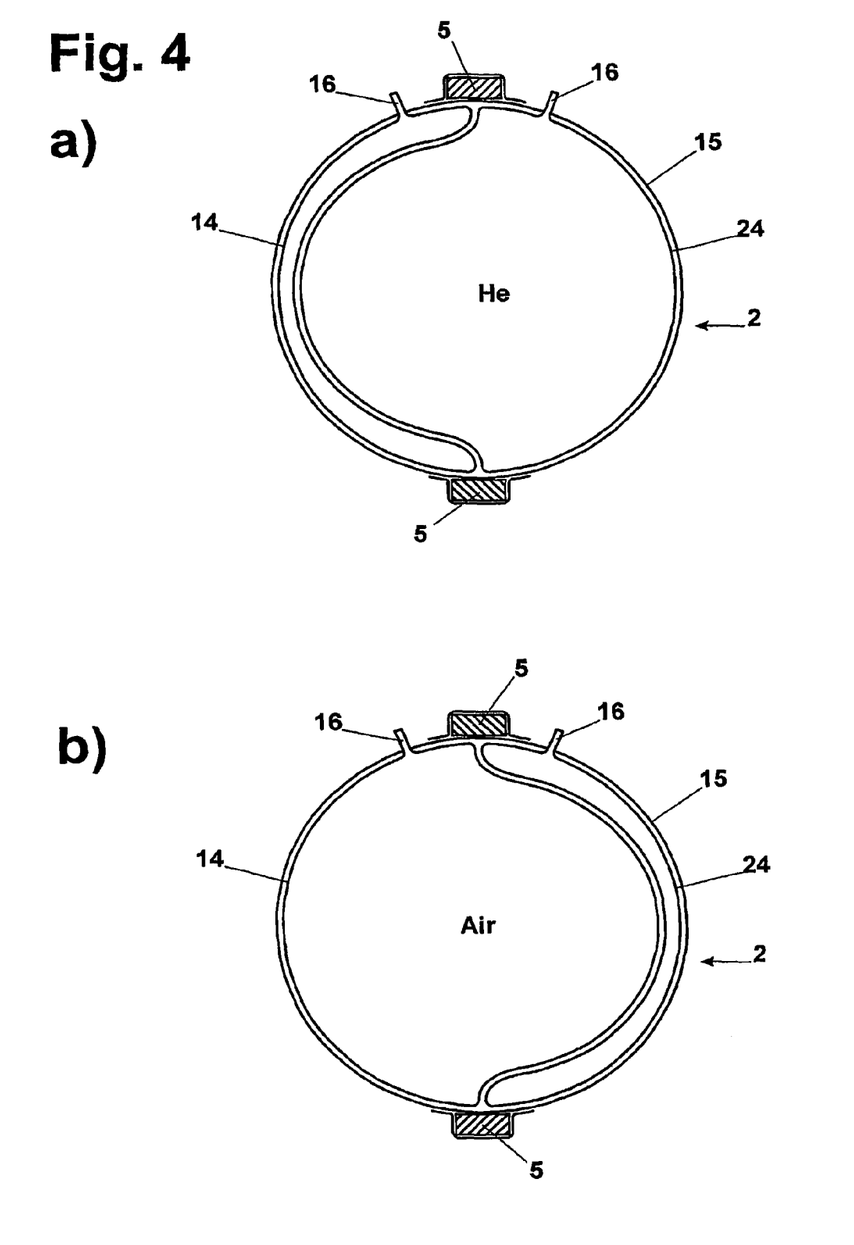

FIG. 4 shows details of an example of embodiment of a bearing-structure element 1, here with two diametrically opposed compression/tension elements 5. On the one hand, hollow bodies 2 of bearing-structure elements 1 can be filled directly with a light gas. On the other hand, it is desirable, for adjusting the buoyancy and for a simplified erection of the structures on the ground, to be able to fill hollow body 2 of bearing-structure elements 1 with air or light gas in a continuous mixing ratio. In order not to contaminate the valuable light gas with air and to render its reuse impossible, two gas-tight bubbles, an air bubble 14 and a light-gas bubble 24, each with at least one valve 16 of its own, are represented in FIG. 4 in hollow body 2 formed by a flexible low-expansion envelope 15. Both bubbles are able, under pressure, essentially to occupy the whole volume of hollow body 2. For this purpose, air bubble 14 and light-gas bubble 24 are either produced from elastic material, or are cut sufficiently large. Whereas light-gas bubble 24 is intended to receive the light gas, air bubble 14 is used as an air reservoir. This arrangement makes it possible to adjust all gradations between air-filled and completely light-gas filled, whereby air or light gas is pumped in or pumped away (so-called ballonet principle). FIG. 4a shows bearing-structure element 1 in the floating state. Light-gas bubble 24 on the right occupying the greater part of the hollow body cross-section is filled with a light gas, air bubble 14 on the left with air. In FIG. 4b, air bubble 14 occupies the greater part of the volume of the hollow body. The buoyancy of bearing-structure element 1 is reduced compared to the situation in FIG. 4a.

Figure 5:
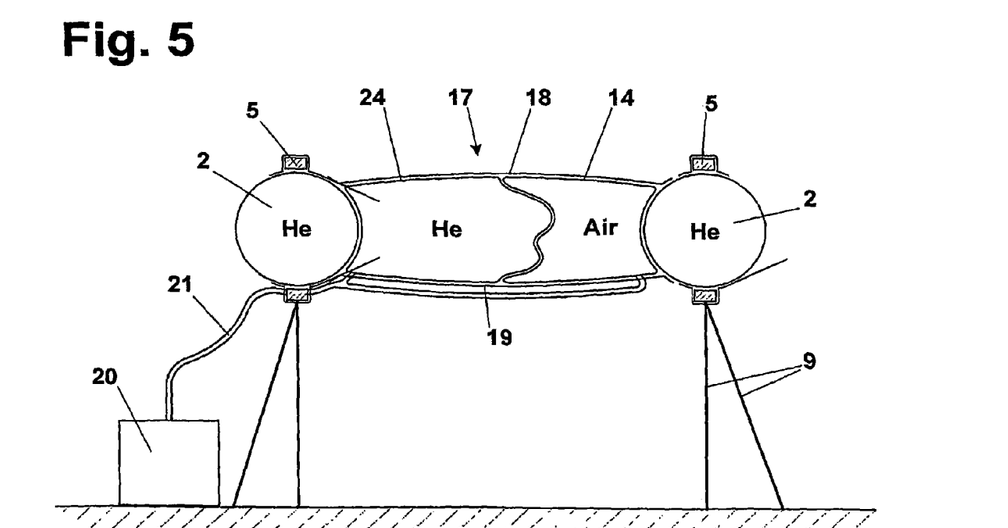
FIG. 5 shows a diagrammatic representation of a fourth example of embodiment of a floating bearing structure in cross-section.

As shown in cross-section in FIG. 5, instead of hollow body 2 of bearing-structure elements 1, an additional hollow space 17 stretched out with a low-expansion membrane or a net between a, for example, rectangular framework of bearing-structure elements 1 can analogously contain a light-gas bubble 24 and an air bubble 14, which can mutually displace one another and can each occupy the whole space 17 for themselves. Upper covering 18 forms the water-tight and wind-tight roof and can be produced from a water-tight low-expansion flexible material, whilst a low-expansion net can also be used for lower covering 19 for weight reasons. Together with bearing-structure elements 1, lower and upper coverings 18, 19 form hollow space 17. A regulating and control device 20, for example, ground-based or positioned on a vehicle, is connected by a connecting line 21 to the roof which is floating and fixed to the ground with rope anchourings 9. The connecting line contains at least two gas lines for the light gas and the compressed air respectively, and if need be additional data lines for the transmission of sensor data or control commands and a power supply line. Regulating and control device 20 contains for example a light-gas reservoir, pressure pumps for air and light gas, electronics for evaluation of the measurement data from sensors fitted in the bearing structure, which measure buoyancy-relevant variables such as for example temperature and pressure inside and outside of hollow body 2 and the forces on rope anchorings 9. Electronic controls, which can keep the buoyancy of a floating bearing structure constant by means of the buoyancy variation possibilities described above, are known to the expert and will not therefore be dealt with in detail here. The example of embodiment shown in FIG. 5 can be implemented by means of a plurality of symmetrically distributed light-gas bubbles 24 and air bubbles 14, so that no significant change in the buoyancy distribution occurs with a variation of the light-gas volume and air volume. This symmetry is achieved with two bubbles, in that hollow space 17 is not divided vertically, as in FIG. 5, but horizontally, whereby light-gas bubble 24 and air bubble 14 extend over the whole horizontal extension of hollow space 17.

Also included in the idea of the invention is an embodiment of a roof according to FIG. 5, which contains no bubbles 14, 24 in hollow space 17, but in which hollow space 17 is formed by gas-tight membranes and can be filled directly with light gas.

Figure 6:
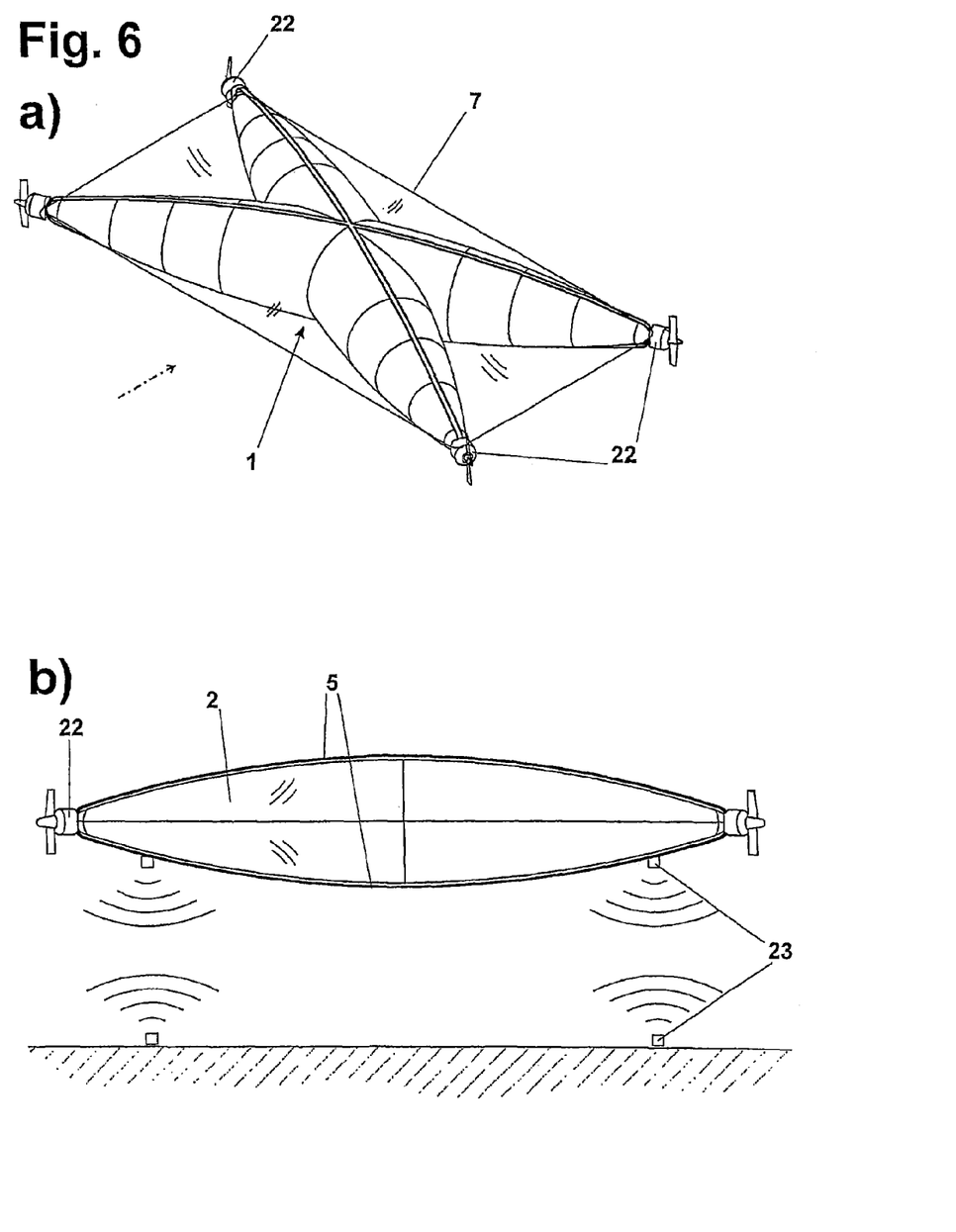
FIG. 6 shows diagrammatic representations of a fifth example of embodiment of a floating bearing structure as an isometric projection and in side view.

FIG. 6 shows a freely floating, self-positioning rain- and sun-roof. In the preceding examples, the floating roof structure, similar to a captive balloon, is anchored rigidly to the ground or held in position by rope anchorings 9 for example. Also feasible and in accordance with the invention are supports which, in the case of insufficient buoyancy of the roof, can take up the resulting residual weight load and thus make expensive buoyancy regulating measures superfluous. In the case of a roof that can be used temporarily, for example for a football stadium, this supporting and position-fixing function can also be taken over by the rigidly mounted stand roof. The example of embodiment of a roof show in FIG. 6 is completely freely floating and without force-inducing ground contact. A cross-shaped bearing-structure element 1 is covered with a covering 7. Covering 7 is only indicated and shown transparently in the figures for the sake of better clarity. This example of embodiment of a floating roof concerns an actual controllable and motorised flying body, which can vary altitude, speed and direction thanks to a plurality of motor-driven propellers 22 which can be fully swivelled vertically and horizontally. In this example there are four of them shown, although according to the invention there are more or fewer fully swivellable drive units. The flying height can on the one hand be determined to a certain degree dynamically by propellers 22 directed upwards or downwards, on the other hand the systems described in FIGS. 4 and 5 with light-gas bubbles 24 and air bubbles 14 can be used for the static buoyancy change. As a simplification, more or less pressure can, for example, be produced in air bubble 14 using a pump, as a result of which the air occupies more or less volume and the buoyancy can thus be varied. A positioning system 23 detects the actual position of the roof. FIG. 6b shows a ground-based system with transmitter/receiver devices on the ground and on the roof. The positioning can also take place, for example, by means of a satellite-assisted navigation system for position-fixing, ground radar for measuring the flying height or propagation-time measurements from radio or sound signals passing between ground and roof to determine the height and position. Other methods of position-fixing are known to the expert, for example image-processing methods, which can analyse still pictures produced by video or produced periodically, compare them with a nominal state and, if need be, calculate necessary corrections, or orientation by ground-based lasers. This example of embodiment differs from an airship especially by its horizontally large, two-dimensionally extending expanse with a simultaneously small surface exposed to the wind, in order to cover as large an area as possible.

There are many possible uses for floating roof constructions with large span widths. Several typical examples are auditorium roofs, temporary protective roofs in the case of roofer's work, temporary full-roofs of half-open sports arenas, the rapid temporary roofing of disaster areas, such as for example the crash zone of an aircraft, bad-weather roofs for open-air events etc. Further possible uses present themselves in the case of roofs which are rendered floating solely for the assembly. As soon as the roof lies correctly positioned on pillars for example, the light gas in the hollow bodies can be replaced by air, which is much more economical for the operation of such a roof over a lengthy period due to reduced consumption of light gas. The advantage of a crane-less, simple and rapid assembly remains, even though the bearings of the roof, be they supports or walls, have to be designed more stable than in the case of a permanently floating operation.

Figure 7:
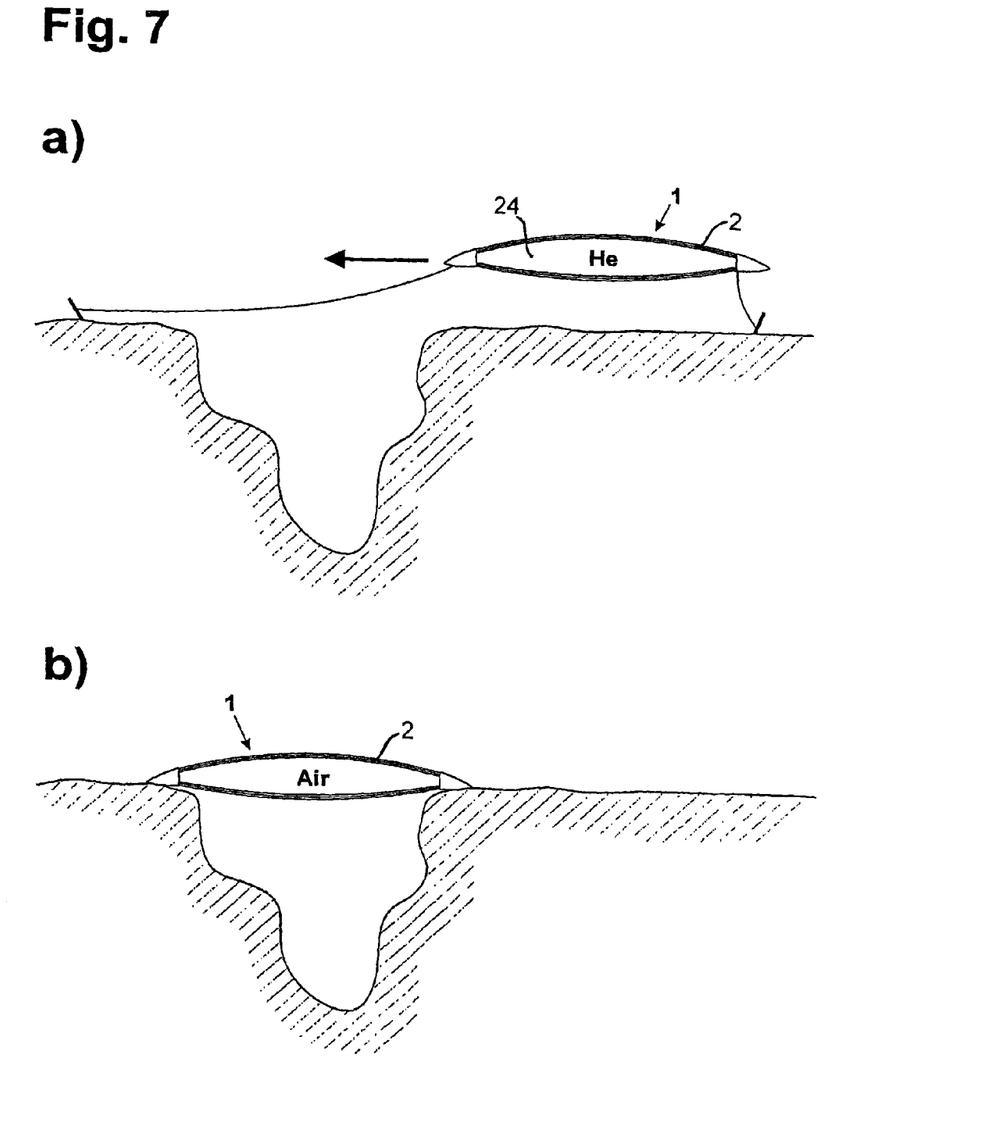
FIG. 7 shows diagrammatic representations of a sixth example of embodiment of a floating bearing structure in side view.

FIG. 7 shows a further example of application and embodiment of floating bearing structures. A bridge with pneumatic supports known from D6 is equipped with additional light-gas bubbles 24 in hollow bodies 2 of bearing-structure elements 1 and, if need be, widened with an additional external buoyancy body 8 (not visible in FIG. 7) lying between the supports and beneath the roadway. Such a bridge can be erected as an emergency or temporary bridge at one side of the obstruction to be spanned over, caused to float, i.e. be filled with light gas (FIG. 7a), and then be pushed or drawn without problem over the obstruction and positioned on the supports. As soon as the bridge is in position, the light gas can be pumped away out of light-gas bubble 24 and hollow body 2 can be pressurised with compressed air (FIG. 7b). It also applies here, of course, that such a bearing structure must float in a stable manner. It may therefore be necessary in the case of a bridge to assemble the roadway only subsequently, because otherwise the structure would be too heavy or too top-heavy to float in a stable manner. If, during the assembly procedure, the bridge is guided for example at one side at the ends of the two bearing-structure elements 1 and is prevented from overturning, the bridge may also be positioned with unstable equilibrium without overturning.

The invention claimed is:

1. A pneumatic structure comprising:
   at least one bearing-structure element, the at least one bearing-structure element comprising:
      a plurality of gas-tight elongated hollow bodies of low expansion flexible material, the plurality of gas-tight elongated hollow bodies operable to be pressurized by a compressed gas;
      wherein at least one first gas-tight elongated hollow body of the plurality of gas-tight elongated hollow bodies comprises:
         at least one first bubble filled with air, the at least one first bubble comprising a variable volume;
         at least one second bubble filled with a light gas, the at least one second bubble comprising a variable volume;
         wherein the at least one first bubble and the at least one second bubble together occupy an entire volume of the at least one first gas-tight elongated hollow body; and
         wherein a volume of the air and a volume of the light gas contained in the at least one first gas-tight elongated hollow body is adjusted via selective pressurization of the at least one first bubble and the at least one second bubble;
      wherein at least one second gas-tight elongated hollow body of the plurality of gas-tight elongated hollow bodies comprises:
         at least one first load-bearing member interoperably coupled to the at least one second gas-tight elongated hollow body and disposed along a generator line of the at least one second gas-tight elongated hollow body, the at least one first load-bearing member supporting longitudinal axial compression;
         at least one second load-bearing member interoperably coupled to the at least one second gas-tight elongated hollow body, the at least one second load-bearing member supporting longitudinal axial tension; and
         wherein the at least one first load bearing member and the at least one second load-bearing member are connected to each other at respective ends.

2. The pneumatic structure according to claim 1, wherein the pneumatic structure stretches out a water-tight covering.

3. The pneumatic structure according to claim 1, wherein at least one buoyancy body is fitted outside at least one gas-tight elongated hollow body of the plurality of gas-tight elongated hollow bodies, wherein the at least one buoyancy body is operable to be pressurised with the light gas.

4. The pneumatic structure according to claim 1, wherein the pneumatic structure further comprises:
   at least one hollow space formed by the at least one bearing-structure element and a plurality of coverings fixed thereto; and wherein the at least one hollow space can be filled with the light gas.

5. The pneumatic structure according to claim 4, wherein:
the at least one hollow space comprises at least one third bubble filled with air and at least one fourth bubble filled with the light gas;
wherein the at least one third bubble and the at least one fourth bubble together occupy an entire volume of the at least one hollow space; and
wherein all gradations of relative pressure between the at least one third bubble and the at least one fourth bubble can be achieved.

6. The pneumatic structure according to claim 4, wherein the plurality of gas-tight elongated hollow bodies and the at least one hollow space are air-tight and are operable to be pressurized with the compressed gas.

7. The pneumatic structure according to claim 1, comprising:
an anchoring element for holding the at least one bearing-structure element at a constant position and at a constant height without force-inducing ground contact.

8. The pneumatic structure according to claim 7, wherein the anchoring element comprises:
at least one swivellable drive unit comprising a propeller for moving the pneumatic structure;
a buoyancy variation device;
a position-fixing device, the position-fixing device comprising at least one sensor, at least one signal generator, and evaluation electronics for measuring a position and a flying height; and
a control and regulating device for directing the pneumatic structure in a remote-controlled manner.

9. The pneumatic structure according to claim 1, wherein the pneumatic structure comprises a roofing.

10. The pneumatic structure according to claim 1, wherein the pneumatic structure comprises a self-erecting roofing.

11. The pneumatic structure according to claim 1, wherein the pneumatic structure comprises a bridge.

12. A pneumatic structure comprising:
at least one bearing-structure element, the at least one bearing-structure element comprising:
a gas-tight elongated hollow body of low expansion flexible material, the gas-tight elongated hollow body operable to be pressurized by a compressed gas, the gas-tight elongated hollow body comprising:
at least one first bubble filled with air, the at least one first bubble comprising a variable volume;
at least one second bubble filled with a light gas, the at least one second bubble comprising a variable volume;
wherein the at least one first bubble and the at least one second bubble together occupy an entire volume of the gas-tight elongated hollow body;
wherein a volume of the air and a volume of the light gas contained in the gas-tight elongated hollow body is adjusted via selective pressurization of the at least one first bubble and the at least one second bubble;
at least one first load-bearing member interoperably coupled to the gas-tight elongated hollow body and disposed along a generator line of the gas-tight elongated hollow body, the at least one first load-bearing member supporting longitudinal axial compression;
at least one second load-bearing member interoperably coupled to the gas-tight elongated hollow body, the at least one second load-bearing member supporting longitudinal axial tension; and
wherein the at least one first load bearing member and the at least one second load-bearing member are connected to each other at respective ends.

13. The pneumatic structure according to claim 12, wherein at least one buoyancy body is fitted outside the gas-tight elongated hollow body, wherein the at least one buoyancy body is operable to be pressurised with the light gas.

14. The pneumatic structure according to claim 12, wherein the pneumatic structure further comprises:
a second gas-tight elongated hollow body;
at least one hollow space formed by the gas tight elongated hollow body, the second gas-tight elongated hollow body, and a plurality of coverings fixed thereto; and
wherein the at least one hollow space can be filled with the light gas.

15. The pneumatic structure according to claim 14, wherein:
the at least one hollow space comprises at least one third bubble filled with air and at least one fourth bubble filled with the light gas;
wherein the at least one third bubble and the at least one fourth bubble together occupy an entire volume of the at least one hollow space; and
wherein all gradations of relative pressure between the at least one third bubble and the at least one fourth bubble can be achieved.

16. The pneumatic structure according to claim 14, wherein the gas-tight elongated hollow body, the second gas-tight elongated hollow body, and the at least one hollow space are air-tight and are operable to be pressurized with the compressed gas.

17. The pneumatic structure according to claim 12, comprising:
an anchoring element for holding the at least one bearing-structure element at a constant position and at a constant height without force-inducing ground contact.

18. The pneumatic structure according to claim 17, wherein the anchoring element comprises:
at least one swivellable drive unit comprising a propeller for moving the pneumatic structure;
a buoyancy variation device;
a position-fixing device, the position-fixing device comprising at least one sensor, at least one signal generator, and evaluation electronics for measuring a position and a flying height; and
a control and regulating device for directing the pneumatic structure in a remote-controlled manner.

19. The pneumatic structure according to claim 12, wherein the pneumatic structure stretches out a water-tight covering.

20. The pneumatic structure according to claim 12, wherein the pneumatic structure comprises a roofing.

21. The pneumatic structure according to claim 12, wherein the pneumatic structure comprises a self-erecting roofing.

22. The pneumatic structure according to claim 12, wherein the pneumatic structure comprises a bridge.

* * * * *